(12) United States Patent
Braun et al.

(10) Patent No.: US 12,503,943 B2
(45) Date of Patent: Dec. 23, 2025

(54) MOBILE MACHINE TOOL AND METHOD FOR SEGMENTALLY MACHINING A COMPONENT

(71) Applicant: Siemens Energy Global GmbH & Co. KG, Bayern (DE)

(72) Inventors: Alexander Braun, Essen (DE); Rick Giesel, Essen (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 466 days.

(21) Appl. No.: 18/009,428

(22) PCT Filed: May 25, 2021

(86) PCT No.: PCT/EP2021/063795
§ 371 (c)(1),
(2) Date: Dec. 9, 2022

(87) PCT Pub. No.: WO2021/259574
PCT Pub. Date: Dec. 30, 2021

(65) Prior Publication Data
US 2023/0235671 A1     Jul. 27, 2023

(30) Foreign Application Priority Data

Jun. 25, 2020    (DE) ............... 10 2020 207 855.6

(51) Int. Cl.
*F01D 5/00*     (2006.01)
*B23Q 9/00*     (2006.01)
(Continued)

(52) U.S. Cl.
CPC ............ *F01D 5/005* (2013.01); *B23Q 9/005* (2013.01); *B23Q 11/0046* (2013.01);
(Continued)

(58) Field of Classification Search
CPC ...... F01D 5/005; F01D 25/243; F01D 25/285; B23Q 9/005; B23Q 11/0046; B23Q 11/08
See application file for complete search history.

(56) References Cited

U.S. PATENT DOCUMENTS 3,843,276 A   10/1974  Williams
5,197,191 A    3/1993  Dunkman
(Continued)

FOREIGN PATENT DOCUMENTS

DE         69124224 T2    8/1997
DE       102007009641 A1  8/2008
(Continued)

OTHER PUBLICATIONS

PCT International Search Report and Written Opinion of International Searching Authority mailed Sep. 13, 2021 corresponding to PCT International Application No. PCT/EP2021/063795 filed May 25, 2021.

*Primary Examiner* — Omar Flores Sanchez
(74) *Attorney, Agent, or Firm* — Wolter Van Dyke Davis, PLLC

(57) ABSTRACT

A mobile machine tool for segmentally machining, in situ, a component, in particular a component of a turbine, which is rotatable about an axis of rotation. The machine tool has a main body, a support element which is held on the main body so as to be movable about a C-axis along a circular-arc-shaped guide path, and a tool module which is held on the support element and is designed to receive a tool. The tool module is located on the support element so as to be linearly movable. A method segmentally machines, in-situ, a component which is mounted in a stationary body so as to be rotatable about an axis of rotation.

21 Claims, 5 Drawing Sheets

(51) Int. Cl.
  *B23Q 11/00* (2006.01)
  *B23Q 11/08* (2006.01)
  *F01D 25/24* (2006.01)
  *F01D 25/28* (2006.01)

(52) U.S. Cl.
  CPC ............ B23Q 11/08 (2013.01); F01D 25/243 (2013.01); F01D 25/285 (2013.01); *B23Q 2210/006* (2013.01); *F05D 2230/80* (2013.01)

(56) References Cited

U.S. PATENT DOCUMENTS

| | | | | |
|---|---|---|---|---|
| 6,141,862 | A * | 11/2000 | Matsui | ................ F01D 25/285 29/714 |
| 6,792,809 | B1 * | 9/2004 | Moore | ................ F01D 25/285 73/624 |
| 2004/0168681 | A1 | 9/2004 | Kalb | |
| 2007/0077148 | A1 | 4/2007 | Bird | |
| 2012/0233837 | A1 * | 9/2012 | Bartlam | ................ F01D 5/3038 29/700 |
| 2012/0309274 | A1 * | 12/2012 | Kelly | ..................... F01D 5/005 451/363 |
| 2013/0149061 | A1 | 6/2013 | Glasow | |
| 2014/0130342 | A1 * | 5/2014 | Casavant | ............... F16M 13/00 16/400 |
| 2017/0173708 | A1 * | 6/2017 | Williams | ............... F04D 29/322 |
| 2019/0184510 | A1 | 6/2019 | Giesel | |
| 2019/0381613 | A1 | 12/2019 | Potyka | |

FOREIGN PATENT DOCUMENTS

| | | |
|---|---|---|
| DE | 102016216857 A1 | 3/2018 |
| EP | 2384842 A1 | 11/2011 |
| FR | 2159777 A5 | 6/1973 |
| GB | 2146560 A | 4/1985 |

* cited by examiner

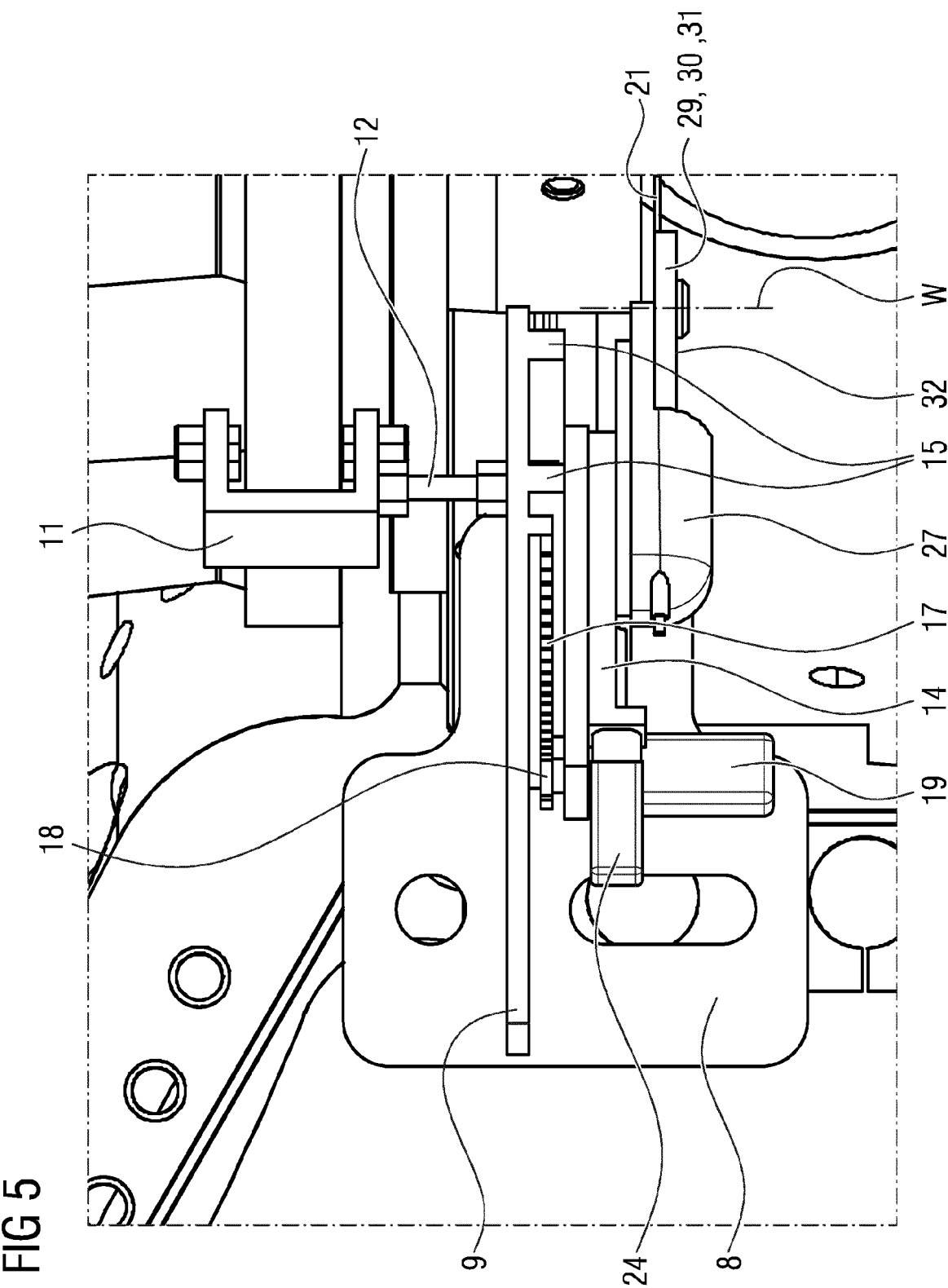

MOBILE MACHINE TOOL AND METHOD FOR SEGMENTALLY MACHINING A COMPONENT

CROSS REFERENCE TO RELATED APPLICATIONS

This application is the US National Stage of International Application No. PCT/EP2021/063795 filed 25 May 2021, and claims the benefit thereof. The International Application claims the benefit of German Application No. DE 10 2020 207 855.6 filed 25 Jun. 2020. All of the applications are incorporated by reference herein in their entirety.

FIELD OF INVENTION

The present invention relates to a mobile machine tool for segmentally machining, in situ, a component which is rotatable about an axis of rotation, in particular a component of a turbine.

The invention furthermore relates to a method for segmentally machining, in situ, a component mounted so as to be rotatable about an axis of rotation in a stationary body.

BACKGROUND OF INVENTION

To generate power, gas turbines are frequently used in power plants to generate electric current by the combustion of gas. Such a gas turbine usually has a turbine housing and a rotor. The rotor usually has a central shaft, which is mounted in the turbine housing so as to be rotatable about a stationary axis of rotation and carries various components, in particular wheels with turbine blades, which are offset axially with respect to one another, i.e. stacked. Here, the individual components are coupled rotationally to the shaft and therefore rotate jointly with it. Components fixed to the housing, for example a diffuser, may also be arranged axially between such components coupled to the shaft, and it is necessary for a defined axial gap to be formed between the rotating components and the components fixed to the housing. Since the components fixed to the housing completely surround the shaft, they are part of the stacking sequence and cannot be readily removed.

Such components of gas turbines of a power station are subject to high mechanical and/or thermal stresses during operation. Owing to the high operating temperatures, creeping processes may occur, for example, with the result that gap dimensions between two components may change, and this can lead to consequential damage to the turbine due to the changed temperature effects. Given this background situation, it is often necessary to subject the components to machining in the course of maintenance work. For example, in the course of such maintenance work, annularly encircling axial projections of components are shortened by means of machining to enable an axial gap between two components to be enlarged.

If machining of a component is due, the only possibility so far has been to first remove the shaft, together with the components held on it and the components fixed to the housing, from the turbine housing. Accordingly, it is necessary as a rule to first disassemble the turbine housing. After the removal of the shaft and the components, the shaft must be unstacked, i.e. the individual components must be removed from the shaft. Only then can the individual component be machined in a suitable production unit, for example a CNC machining center. After machining, it is necessary to re-stack the rotor again and to re-insert it into the turbine housing. However, such a procedure is very time-consuming.

SUMMARY OF INVENTION

It is therefore the object of the present invention to provide a mobile machine tool for in-situ machining of a component rotatable about an axis of rotation, in particular a component of a turbine, and a method for in-situ machining of such a component, thus allowing machining in a time-saving manner.

This object is achieved in the case of a mobile machine tool of the type mentioned at the outset by virtue of the fact that it has a base body, on which fastening means are provided for releasably mounting the base body on a body which is stationary relative to the axis of rotation and defines the axis of rotation, in particular on a turbine housing, a carrier element, which is held on the base body so as to be movable about a C axis along a circular-arc-shaped guide path, and a tool module, which is held on the carrier element and is designed to receive a tool, in particular a cutting tool, preferably a grinding wheel or a side milling cutter, wherein the tool module is arranged on the carrier element so as to be linearly adjustable transversely, in particular radially with respect to the C axis.

Furthermore, the object on which the invention is based is achieved in a method for segmental in-situ machining of the type mentioned at the outset, which comprises the following steps: a) providing a machine tool which is designed to machine the component over a circumferential segment, and mounting the machine tool on the stationary body; b) machining a first circumferential segment of the component using the machine tool; c) rotating the component about its axis of rotation by a predetermined angle; d) machining a further circumferential segment of the component using the machine tool; e) repeating steps c) and d) until the component has been machined over its entire circumference.

The invention is based on the fundamental consideration that the component to be machined is no longer removed from the turbine housing as hitherto in order to rework it, but that it is left in the turbine housing, thus enabling in-situ machining. For this purpose, successive machining of the component is envisaged. To this end, circumferential segments are machined one after the other, and the component to be machined is rotated by a defined angle to machine the next segment. If the component to be machined is a turbine component which is stacked on a shaft, removal from the turbine housing and laborious unstacking of the components are eliminated.

In the mobile machining device according to the invention, a tool module is provided, which carries a corresponding tool for machining and can be moved along two degrees of freedom relative to a base body, which can be fastened to a stationary body, in particular to a turbine housing.

On the one hand, the tool module can be moved about a C axis along a circular arc-shaped guide path, which means that it can be moved and positioned along a circular path. Furthermore, it is adjustable transversely, in particular radially with respect to the C axis and thus to the circular path, thus enabling it to be moved toward and away from the C axis and positioned relative to the latter.

Consequently, when a segment is being machined, the tool can first be positioned radially in such a way that it engages in the component to be machined and is then moved in the circumferential direction along the circular-arc-shaped guide path in order to machine the component over a first circumferential segment. During this process, the C axis of the machine tool preferably coincides with the axis of rotation of the component.

According to a preferred refinement of the machine tool according to the invention, the circular-arc-shaped guide path extends over a center angle of at least 20° and/or at most 40° about the C axis. The extent of the circular-arc-shaped guide path determines the number of circumferential segments which have to be machined in order to machine a component over its entire circumference. At a center angle of 20° about the C axis, the result is thus 18 segments; at a center angle of 40°, the result is 9 segments for machining the component over the entire circumference.

The carrier element is preferably held on the base body by means of a profile guide so as to be movable about the C axis. In a specific configuration, the profile guide can have a double profile, which is provided on the base body and engages positively in a corresponding mating profile provided on the carrier element. By means of a double profile, stable guidance of the carrier element relative to the base body along the circular-arc-shaped guide path is achieved.

In order to achieve precise and, at the same time, stable guidance of the carrier element relative to the base body, the profile guide can have a dovetail or a T-profile which engages positively in a corresponding mating contour on the carrier element. Such profiles make it possible to transmit high forces with precise guidance at the same time and thus effective machining of the component to be machined. The profile guide can also have an arcuate guide with linear rolling bearing elements, preferably balls or rollers, to guide the carrier element relative to the base body. In the case of such a recirculating ball guide or recirculating roller guide, balls or rollers are arranged as rolling elements between the carrier element and a guide profile, and the carrier element is supported by means of these rolling elements. During a movement of the carrier element relative to the guide profile, the rolling elements move on a closed, circulating path, which is formed in the carrier element. Such arcuate support by means of a recirculating ball or roller guide makes it possible, on the one hand, to transmit high forces and, on the other hand, to have a low coefficient of friction, thus providing high positioning accuracy and easy adjustability.

In order to move or position the carrier element relative to the base body, feed means are preferably provided. These can comprise a toothed rack, which extends in an arc along or parallel to the circular guide path, and a gearwheel, which is in engagement with the toothed rack. Such toothing enables precise positioning of the carrier element on the base body with little backlash. The toothed rack is preferably arranged on the base body and the gearwheel is mounted rotatably on the carrier element, wherein the gearwheel is in engagement with the toothed rack, preferably radially on the outside with respect to the C axis. It is advantageous if the gearwheel is mounted on the carrier element so as to be rotatable about a gearwheel axis of rotation extending parallel to the C axis.

The feed means can further comprise a drive unit, which is coupled to the gearwheel in order to drive the gearwheel and move the carrier element relative to the base body. The drive unit can comprise a motor in the form of an electric motor and/or a hydraulic motor and/or a pneumatic motor and, in particular, a transmission coupled to the motor, preferably a planetary transmission. In other words, a motor is provided on the carrier element in order to drive the gearwheel and thus to convert a rotational movement of the gearwheel by engagement with the toothed rack into a movement of the carrier element along the circular guide path. Alternatively, it is also possible to provide a handwheel to drive the gearwheel, thus enabling the carrier element to be moved manually.

In order to guide the tool module radially with respect to the C axis relative to the carrier element, a linear guide can be provided. The linear guide can be designed as a recirculating ball guide or as a recirculating roller guide. The recirculating ball guide or recirculating roller guide preferably comprises a profile rail which has, in particular, a plurality of tracks on which rows of balls are guided and are deflected and recirculated, in the present case in the tool module, preferably in an intermediate plate of the tool module. This results in high force transmission with simultaneously low frictional resistance.

The linear guide can comprise at least one, in particular two, profile rails, which is/are arranged on the carrier element and engages/engage positively in the tool module, in particular in an intermediate plate of the tool module. Thus, in a manner known per se, the tool module can be guided relative to the carrier element transversely, in particular radially with respect to the C axis. By using two profile rails, a high mechanical stability is achieved, while tilting about an axis extending transversely or radially with respect to the C axis is reliably prevented.

In a preferred refinement of this embodiment, the profile rails have a dovetail or a T-profile and engage in a corresponding mating contour on the tool module.

Furthermore, adjusting means can be provided in order to move the tool module relative to the carrier element. In this way, positioning and movement along the linear guide are achieved.

The adjusting means preferably comprise a drive motor in the form of an electric motor and/or a hydraulic motor and/or a pneumatic motor and, in particular, a transmission, preferably a planetary transmission, coupled to the drive motor. An electric motor can preferably be in the form of a stepping motor, thereby enabling particularly precise positioning. Instead of a drive motor, the adjusting means can also comprise a manually actuated handwheel.

The drive motor can be connected in a fixed manner to the carrier element, in particular screwed thereto, and can be coupled to the tool module via a screw mechanism. Via a screw mechanism, a rotational movement of a drive spindle is converted into a translational movement of the tool module along the linear guide.

In a preferred refinement of this embodiment, the screw mechanism is designed as a ball screw and comprises a ball screw shaft, which is coupled to the drive motor for conjoint rotation therewith, and a ball screw nut, which is connected in a fixed manner to the tool module, in particular is introduced into a bore formed in the latter, with the result that a rotary movement of the ball screw shaft is converted into a linear movement of the tool module relative to the carrier element. In such a ball screw, inserted balls transmit the force between the ball screw shaft and the ball nut. Compared to a conventional screw mechanism with two directly interengaging threads, a ball screw is characterized by lower frictional forces and higher positioning accuracy.

In a further refinement of the machine tool, the tool module can comprise drive means for driving a tool mounted on the tool module in rotation about a tool axis. The drive means can comprise an electric motor and/or a hydraulic motor and/or a pneumatic motor. A hydraulic motor or a pneumatic motor, in particular, represents a simple possibility of achieving high drive outputs with a space-saving design. On the other hand, an electric motor can be controlled particularly easily in terms of speed or power.

The tool module can have a mount for a tool which can be driven in rotation about a tool axis, wherein the tool axis extends, in particular, parallel to the C axis. An extent of the tool axis parallel to the C axis makes it possible to penetrate radially from the outside with a side milling cutter or a grinding wheel into the component to be machined and to shorten an axial projection.

In a manner known per se, the mount can comprise a mandrel, onto which a tool with a corresponding opening can be pushed, and securing means for fixing the tool on the mandrel. The securing means can have a screw which is screwed into a threaded bore formed in the mandrel in order to fix a pushed-on tool. Such fastening for a tool is customary, for example, on mobile grinding devices in order to mount a grinding wheel, in particular a cutting-off wheel.

The tool module can further comprise suction means in order to be able to extract chips or other contaminants arising during machining. Machining of a component is always associated with the formation of chips and dust, and therefore extraction is expedient in order to prevent the chips from remaining on the machined component. Furthermore, this protects surrounding components since metal chips impacting at high speed can damage surfaces.

For the same purpose, the tool module can comprise a protective cover, thus protecting the surroundings from flying fragments, in particular chips, during machining.

The fastening means of the base body can have bores, in particular slotted holes, for screwing the base body to a stationary body. A screw connection represents a simple possibility of achieving a fast, stable and simultaneously releasable connection.

To enable stable support of the base body, the base body can have a bearing surface for resting, in particular resting flat, against the stationary body.

According to a preferred refinement of the invention, the base body can have a base plate, on which a bearing surface is formed for resting flat against a stationary body, and comprises a guide plate, which projects, in particular perpendicularly, from the base plate, on which the tool module is held so as to be movable and which, in particular, extends parallel to the plane spanned by the circular arc.

To enable particularly stable fastening of the machine tool a stationary body, support means can be provided on the guide plate, in particular in an outer region of the guide plate remote from the base plate, in order to support the base body perpendicularly to the plane spanned by the circular arc. Such support means can be used, for example, to fix the base body on a further component on a turbine in order to achieve lateral support of the guide plate.

The method according to the invention can furthermore be characterized in that a machine tool according to the invention is used, wherein preferably the C axis of the machine tool coincides with the axis of rotation of the component.

As a further refinement of the method according to the invention, the component to be machined can be a component of a turbine, in particular a component stacked on a central shaft of the turbine, and the stationary body can be a turbine housing or a part thereof. In particular, the turbine housing can be of two-part design and can thus comprise two housing halves which lie flat against one another at a parting plane or parting line.

During normal operation, the turbine component to be machined can be connected in a fixed manner to the housing and can be decoupled from the latter before machining and coupled to a rotor or a central shaft of the turbine for conjoint rotation therewith.

The stationary body can be a housing half of the turbine housing and the machine tool can be mounted on a parting plane that rests against the other housing half during operation.

The method according to the invention is preferably characterized in that, during machining, an axial, annularly encircling projection formed on the component is shortened. Specifically, an annularly encircling section can be cut off from the component.

In order to cut off the annularly encircling section from the component, a grinding wheel which engages radially from the outside or a side milling cutter which engages radially from the outside can be used.

After the annularly encircling section has been cut off, it can be broken down into smaller pieces.

In order to prevent unintentional rotation of the component during machining, the component can be locked during the machining of a circumferential segment. Locking can be accomplished, for example, by fixing the component temporarily on another component.

BRIEF DESCRIPTION OF THE DRAWINGS

Further features and advantages of the present invention will become clear from the following description of a mobile machine tool according to one embodiment of the present invention with reference to the appended drawing. In the drawing:

FIG. 5 shows a detail plan view of the arrangement from FIG. 1.

DETAILED DESCRIPTION OF INVENTION

Figure 1:
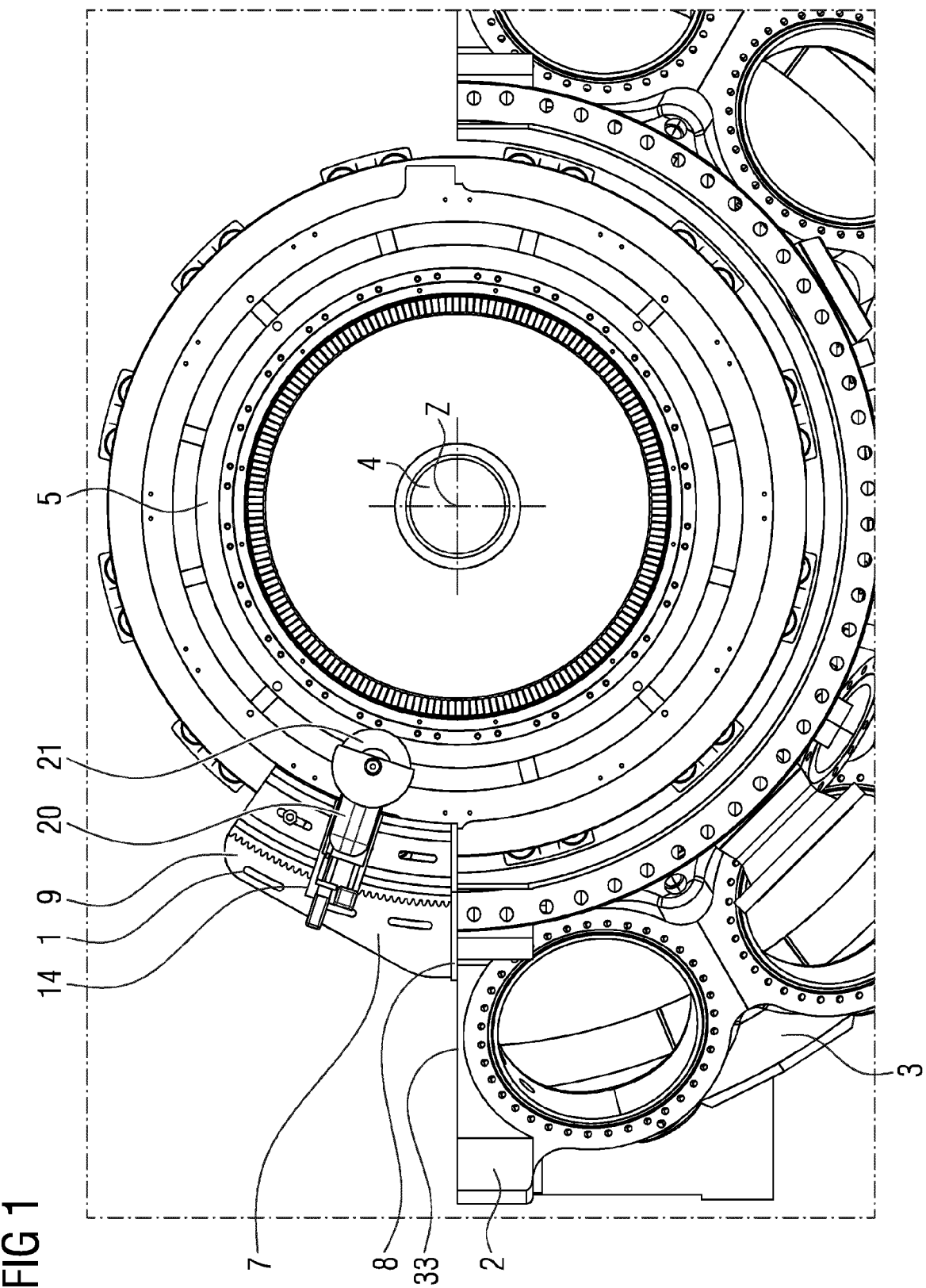
FIG. 1 shows a front view of a mobile machine tool according to one embodiment of the present invention during the machining of a component of a turbine.
Figure 2:
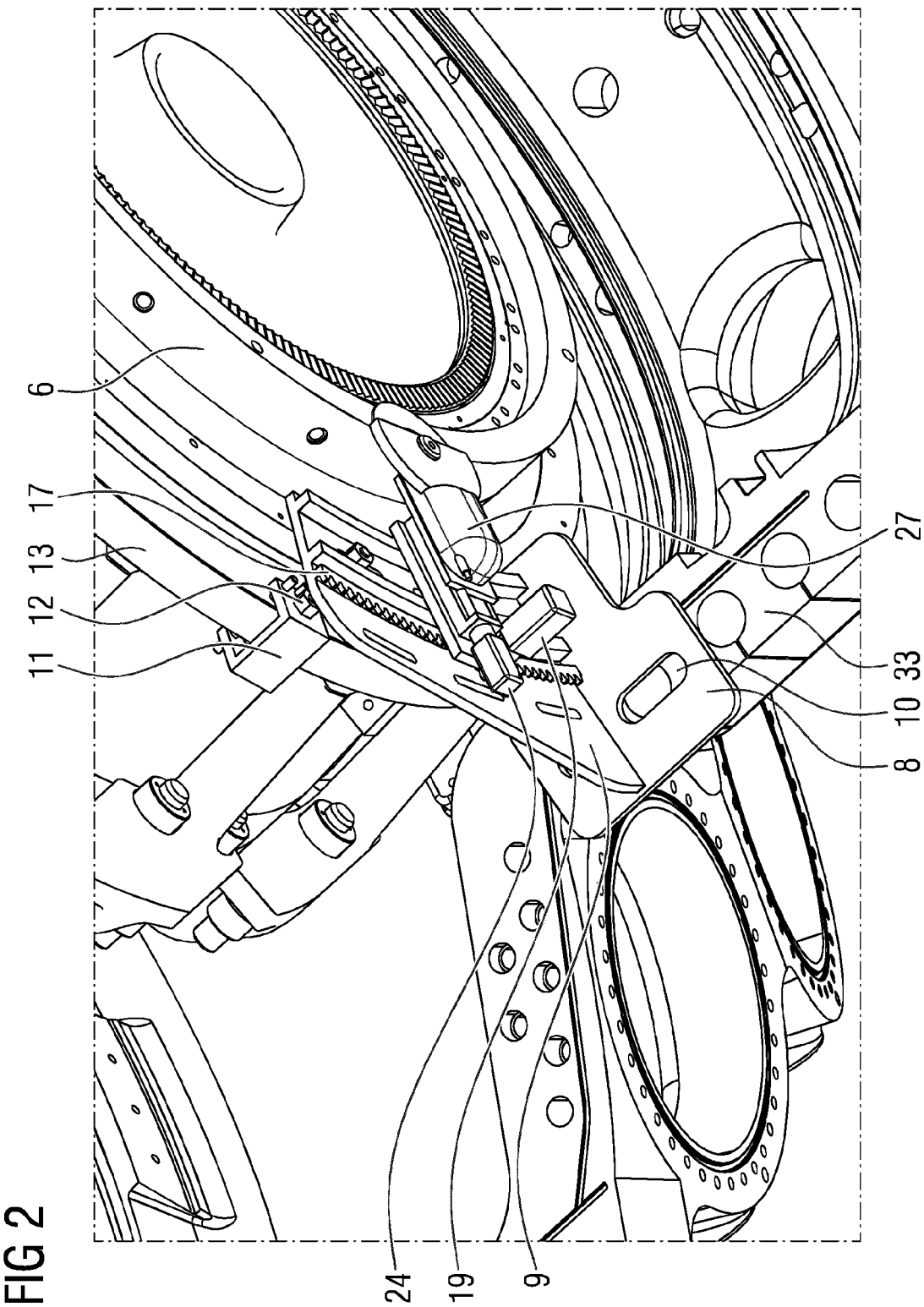
FIG. 2 shows a perspective view of the arrangement from FIG. 1.
Figure 3:
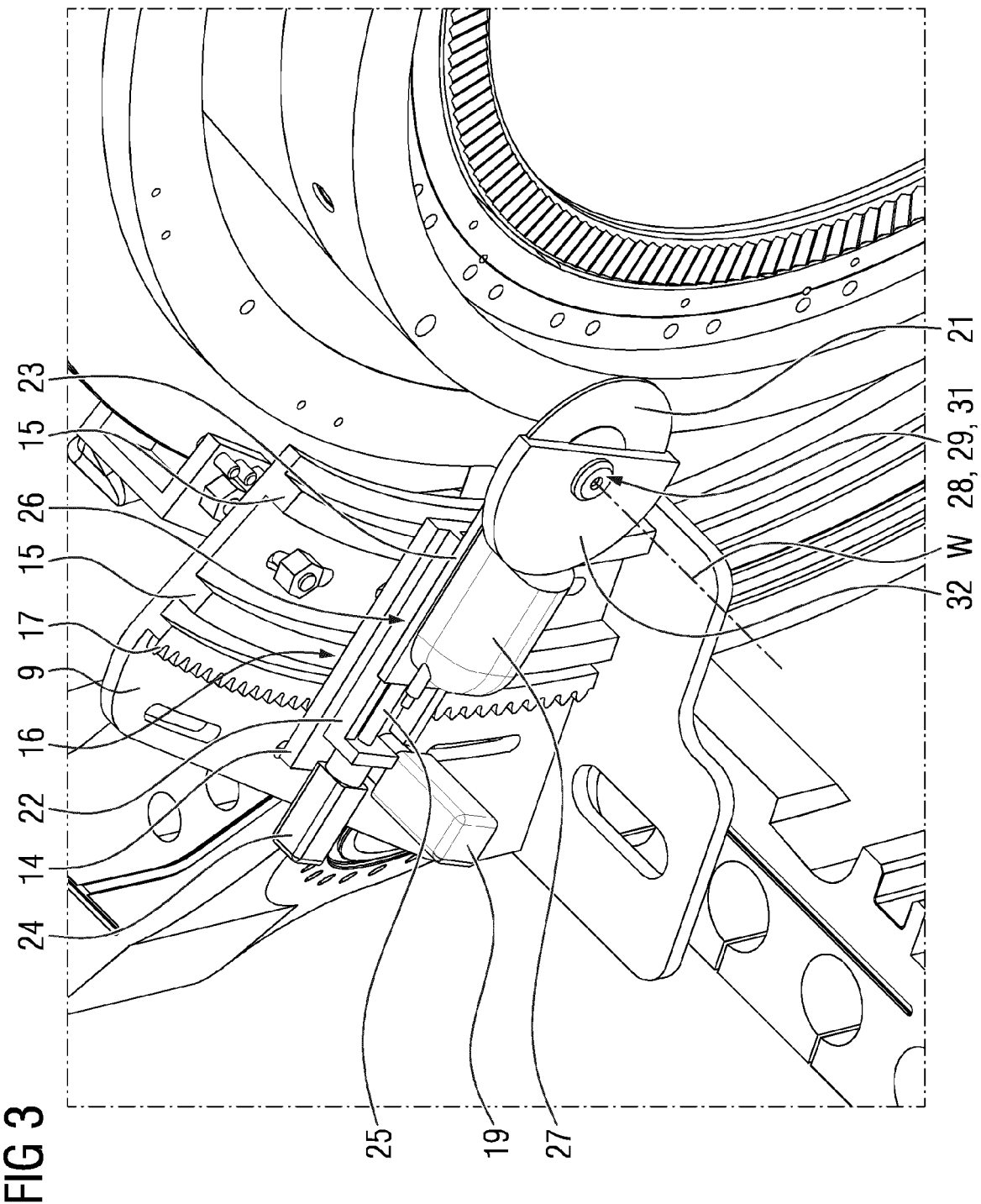
FIG. 3 shows a detailed perspective view of the arrangement from FIG. 1.
Figure 4:
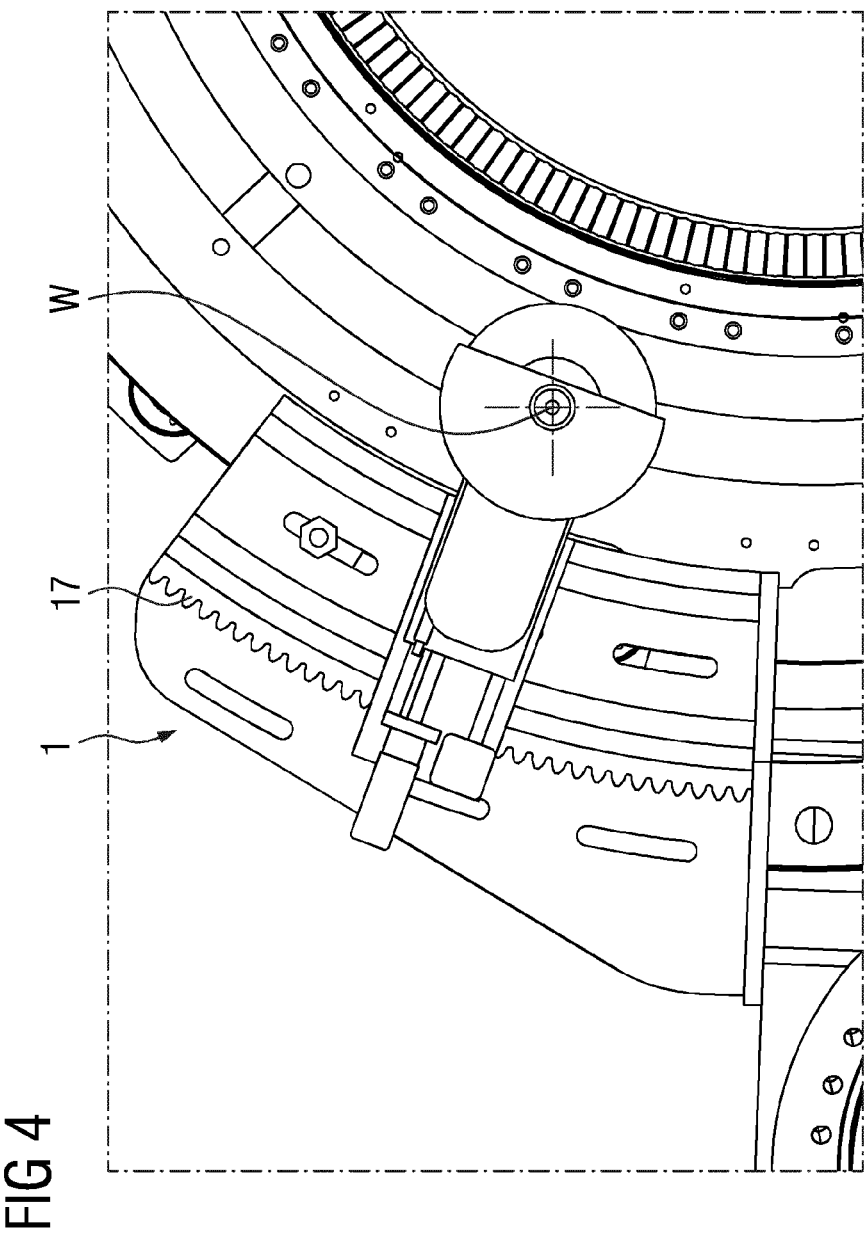
FIG. 4 shows a detail front view of the arrangement from FIG. 1.

FIGS. 1 to 5 show a gas turbine arrangement with a mobile machine tool 1 according to the present invention attached thereto.

The turbine arrangement comprises a stationary turbine housing, which has an upper housing half (not illustrated and removed) and a lower housing half 3. A central shaft 4 is mounted so as to be rotatable about an axis of rotation Z in the turbine housing 2. This shaft carries a plurality of components of the turbine, in particular rotor wheels, which are stacked one behind the other in the direction of the axis of rotation Z and are connected to the shaft 4 for conjoint rotation therewith. Arranged in the stack sequence is a compressor outlet diffuser 5, which does not rotate with the shaft 4 during operation of the turbine but is secured on the turbine housing 2.

The compressor outlet diffuser 5 has an axial projection 6, which runs around in the form of a ring and, during operation of the turbine, faces a component (not illustrated) which is coupled for conjoint rotation to the shaft 4, forming a defined gap. In the present case, this axial projection 6 of the compressor outlet diffuser 5 is to be shortened all the way around in order to increase the gap width with respect to the adjacent component, which corotates during operation.

The mobile machine tool 1 is used for this purpose. The latter has a base body 7, which has a base plate 8 and a guide plate 9, which projects perpendicularly from the latter. Formed on the base plate 8 is a bearing surface to enable it to be placed on a flat surface of the lower housing half 3 of the turbine housing 2. Furthermore, fastening means are provided on the base plate 8 in order to releasably mount the base body 7 on the lower housing half 3. In the present case, the fastening means of the base body 7 comprise slotted holes 10, which are formed in the base plate 8 and via which the base body 7 is screwed to the lower housing half 3 of the turbine housing 2 (screws not illustrated).

In order to achieve particularly stable and secure fastening of the base body 7 to the turbine housing 2, support means are also provided in the region of the guide plate 9 remote from the base plate 8. These comprise a U-shaped fastening bracket 11, which is held at an axial distance from the guide plate 9 by means of a screw 12 and engages in a positive and/or non-positive manner around a further component 13, in particular a component connected nonrotatably to the turbine housing 2.

A carrier element 14 is held on the guide plate 9 of the base body 7 so as to be movable about a C axis along a circular-arc-shaped guide path, which in the present case coincides with the axis of rotation Z of the shaft 4. The circular-arc-shaped guide path extends over a center angle with respect to the C axis of approximately 30°. In this case, the guide plate 9 is aligned in such a way that it extends parallel to the plane spanned by the circular-arc-shaped guide path.

The carrier element 14 is held on the base body 7 by means of a profile guide so as to be movable about the C axis. Specifically, the profile guide has a double profile 15, which is provided on the base body and is formed in one piece with the latter in the present case, and which engages positively in a corresponding mating profile 16 provided on the carrier element 14. The two profiles of the double profile 15 have a rectangular cross section.

In order to be able to position and move the carrier element 14 relative to the base body 7, feed means are also provided. These comprise a toothed rack 17, which extends parallel to the circular-arc-shaped guide path and is arranged on the base body 7, and a gearwheel 18, which is mounted rotatably on the carrier element 14. In this case, the gearwheel 18 is in engagement with the toothed rack 17 radially on the outside with respect to the C axis.

The feed means further comprise a drive unit, which is held on the carrier element 14 and is coupled to the gearwheel 18 in order to drive the gearwheel 18 and move the carrier element 14 relative to the base body 7. Specifically, the drive unit in the present case has a motor in the form of an electric motor 19, which in the present case is screwed to the carrier element 14.

In addition, the mobile machine tool 1 has a tool module 20, which is arranged on the carrier element 14 so as to be linearly adjustable radially with respect to the C axis and is designed to receive a tool, in the present case a grinding wheel 21. In the present case, a linear guide is provided in order to guide the tool module 20 radially with respect to the C axis relative to the carrier element 14. This comprises two profile rails 22, which are arranged on the carrier element 14 and engage positively in an intermediate plate 23 of the tool module 20.

In order to move the tool module 20 relative to the carrier element 14, adjusting means are furthermore provided, which in the present case comprise a drive motor in the form of an electric motor. The electric motor 24 is screwed to the carrier element 14 and coupled to the tool module 20 via a screw mechanism. The screw mechanism is embodied as a ball screw and comprises a ball screw shaft 25, which is coupled to the electric motor 24 for conjoint rotation therewith. Furthermore, the screw mechanism comprises a ball screw nut 26, which is connected in a fixed manner to the intermediate plate 23 of the tool module 20 and is introduced into a bore formed in the latter. In this way, a rotational movement of the ball screw shaft 25 is converted into a linear movement of the tool module 20 relative to the carrier element 14.

In order to drive the grinding wheel 21, the tool module 20 has drive means. In the present case, these likewise comprise an electric motor 27, which is connected in a fixed manner to the intermediate plate 23 of the tool module 20.

The tool module 20 has a mount 28 for the grinding wheel 21, which is rotatable about a tool axis W and extends parallel to the C axis and to the axis of rotation Z. In a specific embodiment, the mount 28 comprises a mandrel 29, onto which the grinding wheel 21 is pushed, and securing means in the form of a screw 30 in order to fix the tool on the mandrel 29. For this purpose, the screw 30 is screwed into a threaded bore 31 formed in the mandrel.

In order to protect the surroundings from flying fragments during machining, the tool module 20 has a protective cover 32, which covers a part of the grinding wheel 21 in the axial direction.

If, as envisaged according to the invention, the axial projection 6 of the compressor outlet diffuser 5 of the turbine arrangement is to be shortened all the way around, the upper housing half (not illustrated) of the turbine housing 2 is removed in a first step. Subsequently, the mobile machine tool 1 is mounted on the lower housing half 3 of the turbine housing 2, specifically on the parting plane 33, which rests against the upper housing half during operation. For this purpose, the base body 7 of the mobile machine tool 1 is screwed to the lower housing half 3 via the slotted holes 10.

Since the compressor outlet diffuser 5 is connected in a fixed manner to the housing during operation but is part of the stacking sequence, the nonrotatable coupling to the turbine housing 2 is released and the compressor outlet diffuser 5 is temporarily coupled rotationally to the shaft 4 for machining purposes, for example via a connection to an adjacent component connected to the shaft 4 for conjoint rotation therewith.

After the mobile machine tool 1 has been mounted on the lower housing half 3 and the compressor outlet diffuser 5 has been coupled to the shaft 4 for conjoint rotation therewith, the first circumferential segment of the axial projection 6 can now be machined. For this purpose, after the shaft 4 has been locked, the rotating grinding wheel 21 is moved radially inward with respect to the C axis by moving the tool module 20 forward along the linear guide relative to the carrier element 14. When the grinding wheel 21 is in a position such as that illustrated, for example, in FIG. 1, in which the grinding wheel completely penetrates the axial projection 6, the carrier element 14 with the tool module 20 held thereon is moved along the circular-arc-shaped guide path about the C axis. As a result, the axial projection 6 is machined over the circumferential segment defined by the circular-arc-shaped guide path. When the carrier element 14 reaches the upper end (illustrated in FIG. 1) of the circular-arc-shaped guide path relative to the base body 7 of the mobile machine tool 1, the grinding wheel 21 can be moved out of the axial projection 6 of the compressor outlet diffuser 5 and the carrier element 14 can be moved into its lower edge position relative to the base body 7.

Now, the compressor outlet diffuser 5 can be rotated about its axis of rotation Z by a predetermined angle, thus enabling the next circumferential segment of the axial projection 6 to be machined in the same way. This procedure is then repeated until the axial projection 6 has been machined over its entire circumference.

After machining over the entire circumference, there is a severed annularly encircling section, which is now broken down manually into smaller pieces to enable it to be removed from the shaft 4. Thus, by means of the method according to the invention, using the mobile machine tool 1 according to the present invention, annularly encircling machining, in particular shortening of the axial projection 6, is made possible without the need for laborious disassembly and machining on a separate system.

Although the invention has been illustrated and described more specifically in detail by means of the preferred illustrative embodiment, the invention is not restricted by the examples disclosed, and other variations can be derived therefrom by a person skilled in the art without exceeding the scope of protection of the invention.

The invention claimed is:

1. A mobile machine tool for segmentally machining, in situ, a component which is rotatable about an axis of rotation, comprising:
    a base body, on which fastening means are provided for releasably mounting the base body on a body which is stationary relative to the axis of rotation and which defines the axis of rotation,
    a carrier element, which is held on the base body so as to be movable about a C axis along a circular-arc-shaped guide path, and
    a tool module, which is held on the carrier element and is designed to receive a tool, wherein the tool module is arranged on the carrier element so as to be linearly adjustable transversely, and
    a linear guide to guide the tool module radially with respect to the C axis relative to the carrier element.

2. The machine tool as claimed in claim 1,
    wherein the circular-arc-shaped guide path extends over a center angle of at least 20° and/or at most 40° about the C axis.

3. The machine tool as claimed in claim 2,
    wherein the carrier element is held on the base body by a profile guide so as to be movable about the C axis.

4. The machine tool as claimed in claim 3,
    wherein the profile guide has a double profile, which is provided on the base body and engages positively in a corresponding mating profile provided on the carrier element and/or
    wherein the profile guide has a dovetail or a T-profile which engages positively in a corresponding mating contour on the carrier element, and/or
    wherein the profile guide has an arcuate guide with linear rolling bearing elements.

5. The machine tool as claimed in claim 4, further comprising:
    feed means for moving the carrier element relative to the base body.

6. The machine tool as claimed in claim 5,
    wherein the feed means comprises a toothed rack, which extends in an arc along or parallel to the circular-arc-shaped guide path, and a gearwheel, which is in engagement with the toothed rack.

7. The machine tool as claimed in claim 6,
    wherein the toothed rack is arranged on the base body and the gearwheel is mounted rotatably on the carrier element, wherein the gearwheel is in engagement with the toothed rack.

8. The machine tool as claimed in claim 6,
    wherein the feed means further comprise a drive unit, which is coupled to the gearwheel in order to drive the gearwheel and move the carrier element relative to the base body.

9. The machine tool as claimed in claim 1,
    wherein the linear guide is designed as a recirculating ball guide or as a recirculating roller guide.

10. The machine tool as claimed in claim 1,
    wherein the linear guide comprises at least one profile rail which is arranged on the carrier element and which engages positively in the tool module.

11. The machine tool as claimed in claim 1, further comprising:
    adjusting means to move the tool module relative to the carrier element.

12. The machine tool as claimed in claim 11,
    wherein the adjusting means comprise a drive motor in the form of an electric motor and/or a hydraulic motor and/or a pneumatic motor and a transmission,
    wherein the drive motor is connected to the carrier element and is coupled to the tool module via a screw mechanism.

13. The machine tool as claimed in claim 12,
    wherein the screw mechanism is designed as a ball screw and comprises a ball screw shaft, which is coupled to the drive motor for conjoint rotation therewith, and has a ball screw nut, which is connected to the tool module, with a result that a rotational movement of the ball screw shaft is converted into a linear movement of the tool module relative to the carrier element.

14. The machine tool as claimed in claim 1,
    wherein the tool module comprises drive means for driving a tool mounted on the tool module in rotation about a tool axis.

15. The machine tool as claimed in claim 1,
    wherein the tool module has a mount for a tool which can be driven in rotation about a tool axis,
    wherein the mount comprises a mandrel, onto which a tool with a corresponding opening can be pushed,
    and securing means for fixing the tool on the mandrel.

16. The machine tool as claimed in claim 1,
    wherein the tool module further comprises suction means in order to be able to extract chips or other contaminants arising during machining, and/or
    wherein the tool module comprises a protective cover for protecting the surroundings from flying fragments during machining, and/or
    wherein the fastening means of the base body have bores for screwing the base body to a stationary body, and/or
    wherein the base body has a bearing surface for resting against the stationary body, and/or
    wherein the base body has the base plate, on which the bearing surface is formed for resting flat against the stationary body, and comprises a guide plate, which projects, from the base plate, on which the tool module is held so as to be movable and which extends parallel to a plane spanned by the circular arc, and/or
    wherein support means are provided on the guide plate in order to support the base body perpendicularly to the plane spanned by the circular arc.

17. A method for segmentally machining, in situ, a component mounted so as to be rotatable about an axis of rotation in a stationary body, comprising:
- a) providing a machine tool as claimed in claim 1, which is designed to machine the component over a circumferential segment, and mounting the machine tool on the stationary body;
- b) machining a first circumferential segment of the component using the machine tool;
- c) rotating the component about its axis of rotation by a predetermined angle;
- d) machining a further circumferential segment of the component using the machine tool; and
- e) repeating steps c) and d) until the component has been machined over its entire circumference.

18. A method for segmentally machining, in situ, a component mounted so as to be rotatable about an axis of rotation in a stationary body, comprising:
- a) providing a machine tool which is designed to machine the component over a circumferential segment, and mounting the machine tool on the stationary body, wherein the machine tool comprises:
  - a base body, on which fastening means are provided for releasably mounting the base body on a body which is stationary relative to the axis of rotation and which defines the axis of rotation,
  - a carrier element, which is held on the base body so as to be movable about a C axis along a circular-arc-shaped guide path, and
  - a tool module, which is held on the carrier element and is designed to receive a tool, wherein the tool module is arranged on the carrier element so as to be linearly adjustable transversely;
- b) machining a first circumferential segment of the component using the machine tool;
- c) rotating the component about its axis of rotation by a predetermined angle;
- d) machining a further circumferential segment of the component using the machine tool;
- e) repeating steps c) and d) until the component has been machined over its entire circumference;
- wherein the component to be machined is a component of a turbine, and the stationary body is a turbine housing or a part thereof;
- wherein during normal operation, the component of a turbine is connected in a fixed manner to the housing and is decoupled from the housing before machining and is coupled to a rotor or to the central shaft of the turbine for conjoint rotation therewith; and/or
- wherein the stationary body is a housing half of the turbine housing and the machine tool is mounted on a parting plane that rests against the other housing half during operation.

19. The method as claimed in claim 18,
wherein during machining, an axial, annularly encircling projection formed on the component is shortened.

20. The method as claimed in claim 18,
wherein the component is locked during the machining of a circumferential segment in order to prevent unintentional rotation.

21. A method for segmentally machining, in situ, a component mounted so as to be rotatable about an axis of rotation in a stationary body, comprising:
- a) providing a machine tool which is designed to machine the component over a circumferential segment, and mounting the machine tool on the stationary body, wherein the machine tool comprises:
  - a base body, on which fastening means are provided for releasably mounting the base body on a body which is stationary relative to the axis of rotation and which defines the axis of rotation,
  - a carrier element, which is held on the base body so as to be movable about a C axis along a circular-arc-shaped guide path, and
  - a tool module, which is held on the carrier element and is designed to receive a tool, wherein the tool module is arranged on the carrier element so as to be linearly adjustable transversely;
- b) machining a first circumferential segment of the component using the machine tool;
- c) rotating the component about its axis of rotation by a predetermined angle;
- d) machining a further circumferential segment of the component using the machine tool;
- e) repeating steps c) and d) until the component has been machined over its entire circumference; and
- wherein during machining, an axial, annularly encircling projection formed on the component is shortened.

* * * * *